United States Patent [19]

Treybig

[11] Patent Number: 4,927,913

[45] Date of Patent: May 22, 1990

[54] CURED PRODUCT FROM THERMOSETTABLE PREPOLYMER PREPARED FROM HETEROCYCLIC MATERIALS HAVING ALKYL SUBSTITUENTS, MONO- OR DIANHYDRIDES, ETHYLENICALLY UNSATURATED MATERIALS AND A HYDROXIDE, CARBONATE OR BICARBONATE OF A METAL OF GROUPS I-A OR II-A

[75] Inventor: Duane S. Treybig, Lake Jackson, Tex.

[73] Assignee: The Dow Chemical Company, Midland, Mich.

[21] Appl. No.: 318,777

[22] Filed: Mar. 3, 1989

Related U.S. Application Data

[60] Division of Ser. No. 142,984, Jan. 12, 1988, Pat. No. 4,847,355, which is a continuation-in-part of Ser. No. 754,696, Jul. 15, 1985, abandoned.

[51] Int. Cl.$^5$ .............................................. C08G 83/00
[52] U.S. Cl. ........................................ 528/480; 524/600; 524/606; 524/607; 525/419; 525/420; 528/322; 528/341; 528/342; 528/345; 528/481
[58] Field of Search .............. 528/341, 342, 345, 322, 528/480, 481; 524/600, 606, 607; 525/419, 420

[56] References Cited

U.S. PATENT DOCUMENTS 4,647,616 3/1987 Swearingen et al. ............... 528/335
4,752,636 6/1988 Treybig ............................... 528/335
4,847,355 7/1989 Treybig ............................... 528/341

*Primary Examiner*—Harold D. Anderson

[57] ABSTRACT

Thermosettable prepolymers are prepared by reacting (A) the reaction product of (1) a heterocyclic material having one or more rings therein, at least one nitrogen atom in a ring and at least two substituent groups which have at least one reactive hydrogen atom attached to a carbon atom which is attached to a heterocyclic ring such as 2,3,5,6-tetramethylpyrazine; (2) a cycloaliphatic or aromatic carboxylic acid mono- or dianhydride such as pyromellitic dianhydride; and (3) a compound containing both a polymerizable ethylenically unsaturated group and at least one group selected from (a) a heterocyclic material having one or more rings, at least one nitrogen atom in a ring and at least one substituent group which has at least one reactive hydrogen atom attached to a carbon atom which is attached to a heterocyclic ring such as 2-methyl-5-vinyl pyridine or (b) a cycloaliphatic or aromatic carboxylic acid mono- or dianhydride group such as cis-5-norbornene-endo-2,3-dicarboxylic anhydride; with (B) an aqueous or alcoholic solution of a hydroxide, carbonate or bicarbonate of a metal of Groups I-A or II-A, such as sodium hydroxide.

These prepolymers when subjected to a thermoset condition by heat and pressure or by homopolymerization in the presence of or copolymerization with an N,N'-bis-imide exhibit good char forming properties when subjected to a temperature of 700° C.

9 Claims, No Drawings

CURED PRODUCT FROM THERMOSETTABLE PREPOLYMER PREPARED FROM HETEROCYCLIC MATERIALS HAVING ALKYL SUBSTITUENTS, MONO- OR DIANHYDRIDES, ETHYLENICALLY UNSATURATED MATERIALS AND A HYDROXIDE, CARBONATE OR BICARBONATE OF A METAL OF GROUPS I-A OR II-A

CROSS REFERENCE TO RELATED APPLICATIONS

This is a division of application Ser. No. 142,984 filed January 12, 1988, now U.S. Pat. No. 4,847,355, which is a continuation-in-part application of application Ser. No. 754,696 filed July 15, 1985 now abandoned.

BACKGROUND OF THE INVENTION

The present invention pertains to thermosettable prepolymers prepared from heterocyclic materials having alkyl substituents, mono- or dianhydrides, polymerizable ethylenically unsaturated materials and an aqueous or alcoholic solution of a hydroxide, carbonate or bicarbonate of a metal of Groups I-A or II-A. These prepolymers when cured provide products which have good char formation when subjected to 700° C. in air.

Prepolymers disclosed in a copending application Ser. No. 754,695, filed on July 15, 1985, now U.S. Pat. No. 4,752,636, prepared from (1) a heterocyclic material having at least one ring and at least one nitrogen atom therein and at least two reactive alkyl substituent groups (2) a cycloaliphatic or aromatic carboxylic acid mono- or dianhydride and (3) a compound containing both a polymerizable ethylenically unsaturated group and at least one group selected from (a) a heterocyclic material having one or more rings and at least one nitrogen atom in a ring and at least one substituent group which has at least one reactive alkyl group which has a reactive hydrogen atom or (b) a cycloaliphatic or aromatic carboxylic acid mono- or dianhydride exhibit, when cured, a char yield of about 64–66 weight percent when subjected to a temperature of about 950° C. in nitrogen. Unfortunately, these cured polymers exhibit a zero percent char yield at 700° C. in air.

It has been discovered that when these prepolymers are reacted with an aqueous or alcoholic solution of a hydroxide, carbonate or bicarbonate of a metal of Groups I-A or II-A, the resultant cured product exhibits an improved char yield when subjected to a temperature of 700° C. in air.

SUMMARY OF THE INVENTION

The present invention pertains to thermosettable prepolymers prepared by reacting (A) the reaction product of
  (1) a heterocyclic material having one or more rings and at least one nitrogen atom in a ring and at least two substituent groups which have at least one reactive hydrogen atom attached to a carbon atom which is attached to a heterocyclic ring;
  (2) a cycloaliphatic or aromatic carboxylic acid mono- or dianhydride; and
  (3) a compound containing both a polymerizable ethylenically unsaturated group and at least one group selected from
    (a) a heterocyclic material having one or more rings and at least one nitrogen atom in a ring and at least one substituent group which has at least one reactive hydrogen atom attached to a carbon atom which is attached to a heterocyclic ring or
    (b) a cycloaliphatic or aromatic carboxylic acid mono- or dianhydride group with (B) an aqueous or alcoholic solution of a hydroxide, carbonate or bicarbonate, of a metal of groups I-A or II-A or combination thereof;

wherein the components of (A) are employed in a molar ratio of (1):(2):(3) of from about 1:0.25:0.25 to about 1:4:4, preferably from about 1:0.5:0.5 to about 1:1.5:1.5, respectively and components A and B are present in quantities which are sufficient to react at least a portion, preferably from about 10 to about 100, most preferably from about 50 to about 100, percent of either the anhydride, lactone or a combination of both anhydride and lactone groups in component (A) with an alkali metal or alkaline earth metal hydroxide, carbonate, bicarbonate or combination thereof with component (B).

Another aspect of the present invention pertains to the cured or thermoset product resulting from curing or thermosetting the above prepolymers by heat and pressure or by either homopolymerization in the presence of at least one N,N'-bis-imide or copolymerization with at least one N,N'-bis-imide.

DETAILED DESCRIPTION OF THE INVENTION

Suitable heterocyclic materials having one or more rings and at least one nitrogen atom and at least two substituent groups which have at least one reactive hydrogen atom attached to a carbon atom which is attached to a ring which can be employed herein include, for example, pyrazines, pyridines, pyrazoles, imidazoles, pyridazines, pyrimidines, purines, pteridines, triazines, quinolines and quinoxalines. Particularly suitable such substituent groups include methyl, —CH(R)$_2$ or —CH$_2$R groups wherein each R is independently a hydrocarbon group containing from 1 to about 20, preferably from 1 to about 10 carbon atoms.

In order for the hydrogen atom of the substituent group which hydrogen atom is attached to a carbon atom attached to a heterocyclic ring to be reactive, the substituent group must be either ortho or para with respect to a nitrogen atom. In the instance of substituted pyrazines, all of the substituent groups attached to a heterocyclic ring carbon atom are ortho with respect to a nitrogen atom.

In J. Org. Chem., 1958, vol. 23, pp. 373–380, Manly et al. stated that 2-methylpyridine reacted with phthalic anhydride to form indanediones whereas 2-methylpyrazine was unreactive toward phthalic anhydride. It has been found that 2-methylpyrazine does condense with phthalic anhydride. Unfortunately, the condensation product is formed in poor yield. However, pyrazine having two or more reactive substituent groups which have at least one reactive hydrogen atom attached to a carbon atom which is attached to the heterocyclic ring condenses with cyclic or aromatic anhydrides in good yield. The enhanced reactivity of pyrazine having two or more such substituent groups compared to 2-methylpyrazine is attributed to the presence of more methyl groups, the location of the substituent groups and the basicity of the pyrazine having such substituents. In general, the basicity and reactivity of the pyrazine having such substituents increases with the quantity of such substituents attached to the pyrazine nucleus.

Particularly suitable as the heterocyclic material which can be employed herein include the pyrazines such as, for example, 2,5-dimethylpyrazine, 2,6-dimethylpyrazine, 2,3,5-trimethylpyrazine, 2,3,5,6-tetramethylpyrazine, 2,5-dimethyl-3,6-pyrazinediamine, 2,3,5-trimethyl-6-nitropyrazine, 5-ethyl-2,6-dimethylpyrazine, 2,5-dimethyl-3-propylpyrazine, 3-chloro-2,5,6-trimethylpyrazine, 3-chloro-2,5-dimethylpyrazine, 2-ethyl-5-methylpyrazine, 2,5-diethylpyrazine, 2-ethyl-3,5-dimethylpyrazine, 2-ethyl-3,6-dimethylpyrazine, 5-methyl-2-propylpyrazine, 3,5-dimethyl-2-propylpyrazine, 2-butyl-3,5-dimethylpyrazine, 2-butyl-3,6-dimethylpyrazine, 2-butyl-5-ethylpyrazine, 2,5-dimethyl-3,6-bis(2-methylpropyl)pyrazine, 2,6-diethyl-3,5-dimethylpyrazine, 2,5-diethyl-3,6-dimethylpyrazine, 2,5-dimethyl-3,6-bis(1-methylethyl)pyrazine, and 2,3,5-trimethyl-6-(2-methylpropyl)pyrazine, mixtures thereof and the like. Pyrazines having only one substituent group having a reactive hydrogen atom attached to a carbon atom which is attached to the heterocyclic ring, such as, for example, 2-methylpyrazine can be mixed or blended with pyrazine having two or more methyl substituents to control the molecular weight of the prepolymer.

Particularly suitable pyridines which can be employed herein include, for example, 2,6-dimethylpyridine, 2,4-dimethylpyridine, 2,3,4-trimethylpyridine, 2,3,6-trimethylpyridine, 2,4,5-trimethylpyridine, 2-ethyl-3,6-dimethylpyridine, 4-ethyl-2,6-dimethylpyridine, 2,6-diethylpyridine, 2,3-dimethyl-6-(1-methylethyl)pyridine, 3,6-dimethyl-2-(1-methylethyl)pyridine, 2-methyl-6-propylpyridine, 2,5-dimethyl-6-propylpyridine, 3-ethyl-2,5,6-trimethylpyridine, 2,3,4,5-tetramethylpyridine, 2,3,4,6-tetramethylpyridine, 2,3,5,6-tetramethylpyridine, pentamethylpyridine, 2,6-dimethyl-3-pyridinamine, 3-chloro-2,6-dimethylpyridine, mixtures thereof and the like. Pyridines having only one substituent group having a reactive hydrogen atom attached to a carbon atom which is attached to the ring, such as, for example, 2-methylpyridine, 4-methylpyridine, 2-ethylpyridine, 2-propylpyridine and the like can be mixed or blended with pyridine having two or more alkyl groups to control the molecular weight of the prepolymer.

Other suitable aromatic nitrogen containing heterocycles which can be employed herein include, pyrazoles, imidazoles, pyridazines, pyrimidines, purines, pteridines, triazines, quinolines and quinoxalines having two or more substituents having a reactive hydrogen atom attached to a carbon atom which is attached to a heterocyclic ring. Such substituent groups include methyl, $-CH(R)_2$ or $-CH_2R$ wherein $R^2$ is as above defined.

Suitable pyrazoles include 3,5-dimethylpyrazole, 1-ethyl-3,5-dimethylpyrazole, 3,4,5-trimethylpyrazole, 3,5-diethylpyrazole, mixtures thereof and the like.

Suitable imidazoles which can be employed herein include 1,2-dimethylimidazole, 2,5-dimethylimidazole, 2,4-dimethylimidazole, 2,4,5-trimethylimidazole, 3-ethyl-4-methylimidazole, mixtures thereof and the like.

Suitable pyridazines include 3,5-dimethylpyridazine, 4-chloro-3,5-dimethylpyridazine, 3,4,5-trimethylpyridazine, 3,4,6-tripropylpyridazine, mixtures thereof and the like.

Suitable pyrimidines include 2,4-dimethylpyrimidine, 4,6-dimethylpyrimidine, 2,6-dimethyl-4-pyridinamine, 6-hydroxy-2,4-dimethylpyrimidine, 2,5-dihydroxy-4,6-dimethylpyrimidine, 4,6-dimethylpyrimidin-2-yl mercapto acetic acid, 2,4,6-trimethylpyrimidine, 2,4,6-tripropylpyrimidine, mixtures thereof and the like.

Suitable purines which can be employed herein include, for example, 2,8-dimethylpurine, 2,8-dimethyl-6-purinamine, 2,6,8-trimethylpurine, mixtures thereof and the like.

Suitable pteridines include 6,7-dimethylpteridine, 2,6-dimethylpteridine, 2,4,7-trimethylpteridine, 2,4,6,7-tetramethylpteridine, mixtures thereof and the like.

Suitable triazines which can be employed herein include 3,5-dimethyl-1,2,4-triazine, 3,6-dimethyl-1,2,4-triazine, 3,5,6-trimethyl-1,2,4-triazine, 2,4-dimethyl-1,3,5-triazine, 2,6-dimethyl-1,3,5-triazine, 2,4,6-trimethyl-1,3,5-triazine, mixtures thereof and the like.

Suitable quinolines include 2,4-dimethylquinoline, 2,4,6-trimethylquinoline, 2,4,6,7-tetramethylquinoline, mixtures thereof and the like.

Suitable quinoxalines include 2,3-dimethylquinoxaline, 2,3,7-trimethylquinoxaline, 2,3,6,8-tetramethylquinoxaline, mixtures thereof and the like.

Molecular weight control of the prepolymer can be obtained by the addition of an aromatic nitrogen containing heterocyclic material having one substituent group which has at least one reactive hydrogen atom attached to a carbon atom which is attached to the heterocyclic ring as a chain terminator to an aromatic nitrogen containing heterocyclic material having two or more substituent groups which have at least one reactive hydrogen atom attached to a carbon atom which is attached to the heterocyclic ring. As an example, pyrazoles, pyridines, imidazoles, pyridazines, pyrimidines, purines, pteridines, triazines, quinolines or quinoxalines having one substituent group which has at least one reactive hydrogen atom attached to a carbon atom which is attached to the heterocyclic ring can be mixed with an aromatic heterocycle containing one or more nitrogens and having two or more substituent groups which have at least one reactive hydrogen atom attached to a carbon atom which is attached to the heterocyclic ring.

It has also been found that two molecules of a nitrogen containing heterocycle having methyl substituents can condense with a single anhydride group. Since the anhydride group contributes at least two sites for reaction with a nitrogen containing heterocycle having reactive substituent groups which have at least one reactive hydrogen atom attached to a carbon atom which is attached to the heterocyclic ring, a polymer can be formed when the nitrogen containing heterocycle having two or more such substituent groups is reacted with a dicarboxylic acid monoanhydride.

Suitable dicarboxylic acid monoahydrides which can be employed herein include, for example, those represented by the formula

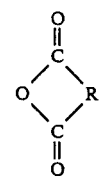

wherein R is a divalent radical such as, for example,

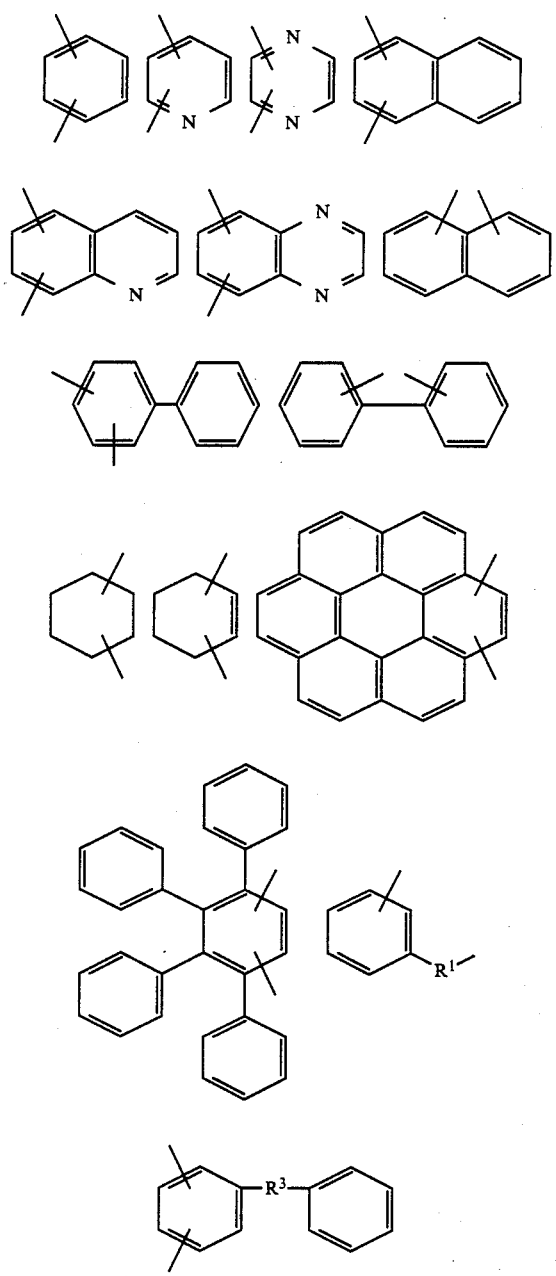

wherein $R^1$ is alkyl, or one of the following:

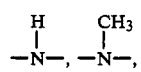

and

wherein $R^2$ is alkyl, aryl or aralkyl, or such groups containing substituents such as, for example, halogen, nitro or amino and where $R^3$ is alkylene, oxygen, sulfur, oxyalkylene, polyoxyalkylene, or one of the following:

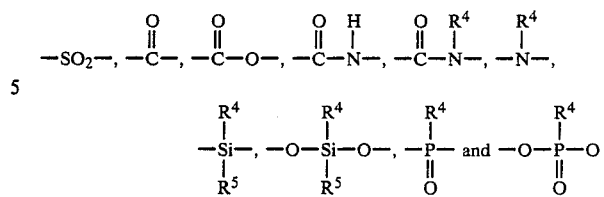

wherein $R^4$ and $R^5$ are alkyl, aryl or such groups containing substituents such as, for example, halogen, nitro or amino.

The preferred monoanhydrides are those in which the carbon atoms of the pair of carbonyl groups are directly attached to ortho carbon atoms in the R group to provide a 5-member ring such as, for example,

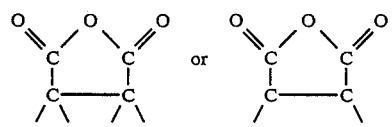

Suitable such monoanhydrides include, for example, phthalic anhydride, 3-nitrophthalic anhydride, tetraphenylphthalic anhydride, tetrachlorophthalic anhydride, tetrabromophthalic anhydride, hexahydro-4-methylphthalic anhydride, pyrazine-2,3-dicarboxylic anhydride, pyridine-2,3-dicarboxylic anhydride, quinoxaline-2,3-dicarboxylic anhydride, 2-phenylglutaric anhydride, isatoic anhydride, N-methyl isatoic anhydride, 5-chloroisatoic anhydride, 5-nitroisatoic anhydride, diphenic anhydride, 1,8-naphthalic anhydride, 4-chloro-1,8-naphthalic anhydride, 3-nitro-1,8-naphthalic anhydride, 3,4-coronenedicarboxylic anhydride, trans-1,2-cyclohexaneanhydride, 3,3-tetramethyleneglutaric anhydride, di-camphoric anhydride, mixtures thereof and the like.

Suitable tetracarboxylic acid dianhydrides which can be employed herein include, for example, those represented by the formula

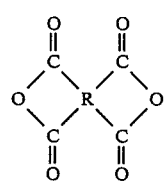

wherein R is a tetravalent aromatic radical such as, for example:

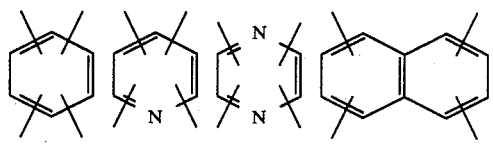

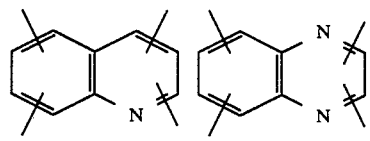

-continued

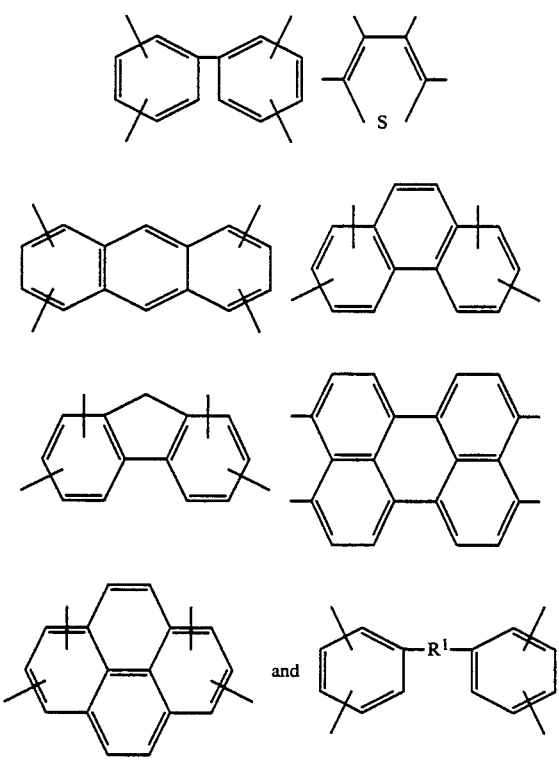

where $R^1$ is alkylene, oxygen, sulfur, oxyalkylene, polyoxyalkylene, or one of the following:

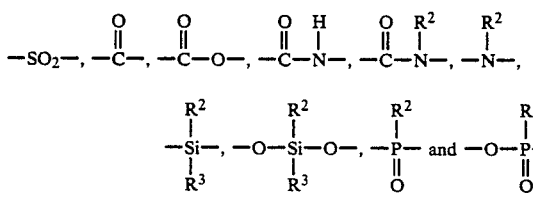

wherein $R^2$ and $R^3$ are alkyl, aryl or aralkyl, or such groups containing substituents such as, for example, halogen, nitro or amino.

Suitable such dianhydrides include, for example, pyromellitic dianhydride, benzene-1,2,3,4-tetracarboxylic dianhydride, pyridine-2,3,5,6-tetracarboxylic dianhydride, pyrazine-2,3,5,6-tetracarboxylic dianhydride, naphthalene-2,3,6,7-tetracarboxylic dianhydride, naphthalene-1,4,5,8-tetracarboxylic dianhydride, naphthalene-1,2,4,5-tetracarboxylic dianhydride, 2,6-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, 3,4,9,10-perylenetetracarboxylic dianhydride, thiophene-2,3,4,5-tetracarboxylic dianhydride, bis(3,4-dicarboxyphenyl)sulfone dianhydride, 2,3,2',3'-benzophenonetetracarboxylic dianhydride, 2,3,3',4'-benzophenonetetracarboxylic dianhydride, bis(2,3-dicarboxyphenyl)methane dianhydride, bis(3,4-dicarboxyphenyl)methane dianhydride, 1,1-bis(3,4-dicarboxyphenyl)ethane dianhydride, 2,2-bis(2,3-dicarboxyphenyl)propane dianhydride, bis(3,4-dicarboxyphenyl)ether dianhydride, anthracene-2,3,6,7-tetracarboxylic dianhydride, fluorene-2,3,6,7-tetracarboxylic dianhydride, pyrene-1,2,7,8-tetracarboxylic dianhydride, quinoxaline-2,3,6,7-tetracarboxylic dianhydride, phenazine-2,3,7,8-tetracarboxylic dianhydride, 1,1-bis(2,3-dicarboxy-5-oxyphenyl)ethane dianhydride, mixtures thereof and the like.

Ethenyl (vinyl) termination agents or compounds containing at least one polymerizable unsaturated group include (a) ethenyl substituted aromatic nitrogen heterocyclic compounds having one or more rings and at least one substituent group which has at least one reactive hydrogen atom attached to a carbon atom which is attached to a heterocyclic ring and (b) a cycloaliphatic or aromatic carboxylic acid anhydride having at least one polymerizable unsaturated group. Suitable ethenyl substituted aromatic nitrogen heterocyclic compounds having at least one or more substituent group which has at least one reactive hydrogen atom attached to a carbon atom which is attached to the heterocyclic ring include 3-ethenyl-2-methylpyridine (2-methyl-3-vinylpyridine); 5-ethenyl-2-methylpyridine (2-methyl-5-vinylpyridine); 6-ethenyl-2-methylpyridine (2-methyl-6-vinylpyridine); 2-(buta-1,3-dienyl)-6-methylpyridine; 6-methyl-2-(pent-1-enyl)pyridine; 2-(but-1,3-dienyl)-4,6-dimethylpyridine; 2-methyl-4(prop-1-enyl)pyridine; 2-(6-(4-(1-methylethen-1-yl)cyclohex-1-enyl))-6-methylpyridine; 2-(6-(4-(1-methylethen-1-yl)cyclohex-1-enyl))-4,6-dimethylpyridine; 3,5-diethenyl-2-methylpyridine; 2,5-diethenyl-3,4-dimethylpyridine; 3,5-diethenyl-2,4,6-trimethylpyridine; 3-chloro-5-ethenyl-2,6-dimethylpyridine; 5-ethenyl-6-ethyl-2-methylpyridine; 5-ethenyl-2-methyl-4-propylpyridine; 3-ethenyl-2,6-diethylpyridine; 6-ethenyl-2,4-diethylpyridine; 3-ethenyl-2-methylpyrazine (2-methyl-3-vinylpyrazine); 5-ethenyl-2-methylpyrazine (2-methyl-5-vinylpyrazine); 6-ethenyl-2-methylpyrazine (2-methyl-6-vinylpyrazine); 5-ethenyl-2,6-dimethylpyrazine; 5-ethenyl-2,3,6-trimethylpyrazine; 3,5-diethenyl-2,6-dimethylpyrazine; 5-ethenyl-2-ethyl-6-methylpyrazine; 5-ethenyl-2,6-diethylpyrazine; 2-methyl-5-(1-methylethenyl)-pyrazine; 2-(2-ethylbut-1-enyl)-6-methylpyrazine; 2-methyl-6-(2-methylprop-1-enyl)pyrazine; 2-(but-1,3-dienyl)-6-methylpyrazine; 3,6-diethyl-2-(pen-1-enyl)-pyrazine; 2-(but-1,3-dienyl)-3,6-dimethylpyrazine; 2-methyl-5-(prop-1-enyl)pyrazine; 2-(6-(4-(1-methylethen-1-yl)cyclohex-1-enyl))-6-methylpyrazine; 2-(6-(4-(1-methylethen-1-yl)cyclohex-1-enyl))-5,6-dimethylpyrazine; 2-(6-(4-(1-methylethen-1-yl)cycylohex-1-enyl))-3,5,6-trimethylpyrazine; 5-ethenyl-3-methylpyridazine; 4-chloro-5-ethenyl-3-methylpyridazine; 5-ethenyl-3,6-dimethylpyridazine; 4-ethenyl-2,6-dimethylpyrimidine; 6-ethenyl-2-methyl-4-pyrimidinamine; 6-ethenyl-2,8-dimethylpurine; 8-ethenyl-2,6-dimethylpurine; 6-ethenyl-8-ethyl-2-methylpurine; 6-ethenyl-2-methyl-8-purinamine; 2-ethenyl-6,7-dimethylpteridine; 6-ethenyl-2,4-dimethyl-1,3,5-triazine; 5-ethenyl-3,6-dimethyl-1,2,4-triazine; 5-ethenyl-3-methyl-6-propyl-1,2,4-triazine; 7-ethenyl-2,4,8-trimethylquinoline; 6,7-diethenyl-2,4,8-trimethylquinoline; 6-ethenyl-2,3,8-trimethylquinoxaline; 4-ethenyl-2,5-dimethylimidazole; 4-ethenyl-3,5-dimethylpyrazole and their mixtures.

Suitable cycloaliphatic or aromatic carboxylic acid monoanhydrides having at least one polymerizable unsaturated group are represented by the formula:

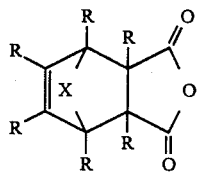

in which R is a hydrogen, halogen or a 1 to 4 carbon alkyl group and X is either —CH₂—, —CH₂CH₂—, —O—, —NH—, —CCl₂—, or —S—. Preferred cyclic or aromatic carboxylic acid anhydrides having at least one polymerizable unsaturated group include 3,6-endomethylene-1,2,3,6-tetrahydrophthalic anhydride (cis-5-norbornene-endo-2,3-dicarboxylic anhydride), endo-bicyclo[2.2.2]octa-5-ene-2,3-dicarboxylic anhydride, 3,6-endoxo-1,2,3,6-tetrahydrophthalic anhydride (7-oxa-bicyclo[2.2.1]-hept-5-ene-2,3-dicarboxylic anhydride), 1,4,5,6,7,7-hexachloro-5-norbornene-2,3-dicarboxylic anhydride, mixtures thereof and the like. Other cyclic or aromatic carboxylic anhydrides include cis-1,2,3,6-tetrahydrophthalic anhydride (cis-4-cyclohexane-1,2-dicarboxylic anhydride), citraconic anhydride, 2,3-dimethylmaleic anhydride, dichloromaleic anhydride, combinations thereof and the like.

J. Ploquin et al in *J. Heterocyclic Chem.*, 1980, Vol. 17, pp. 961-973 described the reaction path for the reaction of 4-methylpyridine with phthalic anhydride in terms of two steps: (1) a nucleophilic addition and dehydration into 3-picolylidenylphthalides,

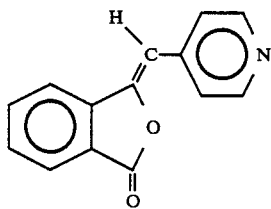

and (2) a molecular rearrangement into 1,3-indanedione,

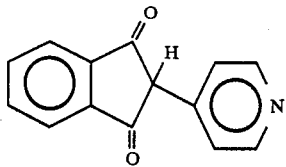

Phthalide and/or indanedione type structures are also formed from the reaction of heterocyclic materials having alkyl substituents, mono- or dianhydrides and polymerizable ethylenically unsaturated materials. The phthalide type structure contains a lactone group,

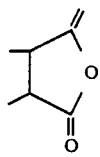

Unreacted terminal anhydride groups may be present in the ethenyl terminated prepolymer. Therefore, the product resulting from reacting components A-1, A-2 and A-3 contain either one or more lactone groups or one or more anhydride groups or a combination of such groups. A carboxylic acid salt of the ethenyl terminated prepolymer is believed to be formed from the reaction of a suitable base with (1) any of the lactone group and (2) available and unreacted terminal anhydride groups present in the prepolymer.

Suitable bases that can be reacted with the anhydride and lactone groups of the ethenyl terminated prepolymer includes the hydroxides, carbonates and bicarbonates of the alkali metal and alkaline earth metals. Suitable alkali metal and alkaline earth metals include sodium, potassium, lithium, calcium, barium, magnesium and cesium. Particularly suitable metals are sodium, potassium, calcium and magnesium.

Suitable alkali metal or alkaline earth metal hydroxides, carbonates or bicarbonates include, for example, sodium hydroxide, potassium hydroxide, lithium hydroxide, calcium hydroxide, barium hydroxide, magnesium hydroxide, sodium carbonate, potassium carbonate, lithium carbonate, barium carbonate, calcium carbonate, magnesium carbonate, sodium bicarbonate, potassium bicarbonate, lithium bicarbonate, barium bicarbonate, calcium bicarbonate, magnesium bicarbonate, mixtures thereof and the like.

The alkali metal or alkaline earth metal carboxylic acid salt of the ethenyl terminated prepolymers can be prepared by reacting the alkylsubstituted aromatic nitrogen heterocyclic material, cycloaliphatic or aromatic carboxylic mono-or dianhydride, vinyl termination agent and aqueous or methanolic solution of alkali metal or alkaline earth metal hydroxide, carbonate or bicarbonate in a two or three step process. The two step process comprises (1) condensing the alkyl substituted aromatic nitrogen heterocyclic material, cycloaliphatic or aromatic carboxylic mono- or dianhydride with the vinyl termination agent to form ethenyl terminated prepolymer and then (2) reacting the ethenyl terminated prepolymer with an aqueous or methanolic solution of alkali metal or alkaline earth metal hydroxide, carbonate or bicarbonate. The three step process comprises (1) condensing the alkyl substituted aromatic nitrogen heterocyclic material with a cycloaliphatic or aromatic carboxylic mono- or dianhydride to form a prepolymer, (2) condensing the vinyl termination agent with the prepolymer to form ethenyl terminated prepolymer and then (3) reacting the ethenyl terminated prepolymer with an aqueous or alcoholic solution of alkali metal or alkaline earth metal hydroxide, carbonate or bicarbonate. The condensation of alkyl substituted aromatic nitrogen heterocyclic materials, cycloaliphatic or aromatic carboxylic mono- or dianhydride and vinyl termination agent can be carried out neart or in the presence of a solvent. A solvent is preferred. Dehydration conditions are suitably provided by a dehydrating agent and/or a catalyst to activate the alkyl groups. In the condensation steps without a vinyl termination agent, condensation is carried out at a temperature of from about 50° to about 220° C., preferably from 120° to 180° C. for about 10 minutes to 128 hours (600 s to 460,800 s), especially 30 minutes to 64 hours (1800 s to 230,400 s). In the condensation steps with a vinyl termination agent, condensation is carried out at a temperature of from about 50° to about 140° C., preferably from 80° to 120° C. for about 1 to 64 hours (3600 s to 230,400 s), preferably from 6 to 24 hours (21,600 s to 86,400 s). The reaction of an aqueous or methanolic solution of alkali metal or alkaline earth metal hydroxide, carbonate or bicarbonate with the ethenyl terminated prepolymer can be carried out at a temperature of from 0° to 220° C., preferably from 25° to about 140° C. for about 10 minutes to 24 hours (600 s to 86,400 s), preferably from 30 minutes to 6 hours (1800 s to 21,600 s).

Suitable solvents include ketones, ethers, amides, acids, aromatic heterocycles containing no substituent groups which have at least one reactive hydrogen atom attached to a carbon atom which is attached to the ring, chlorinated solvents and the like. Particularly suitable solvents include, tetrahydrofuran, pyridine, glacial acetic acid, dimethylformamide, N,N-dimethylacetamide, N,N-diethylformamide, N,N-dimethylmethoxyacetamide, hexamethylphosphotriamide, N-methylpyrrolidinone, mixtures thereof and the like.

Suitable catalysts include, for example, acids, Lewis acids, bases or salts. Particularly suitable acids include, for example, sulfuric, hydrochloric, acetic or p-toluenesulfonic acid. Particularly suitable Lewis acids include boron trifluoride. Particularly suitable bases include, for example, hydroxides of alkali or alkaline earth metals or of quaternary ammonium. Particularly suitable salts include, for example, zinc chloride or aluminum chloride. The use of such catalysts is not indispensable but it reduces the time required for the reaction. The amount is e.g. of from about 0.1 to about 10 mole % with respect to the cycloaliphatic or aromatic carboxylic acid mono or dianhydride. If desirable, larger or lesser quantities can be employed.

The reaction can also be accelerated by certain substances such as methyl iodide, methyl sulfate, benzyl chloride etc., capable of forming with the pyrazinic base quaternary ammonium derivatives, such substances being usable in catalytic amounts or higher proportions.

Dehydrating agents such as acetic anhydride, trifluoroacetic anhydride, propionic anhydride and the like can promote the reactions and its action can be sufficient to render superfluous the incorporation of a catalyst. The amount of anhydride used ranges from 1 to 10 moles per mole of vinyl termination agent, preferably 1.1 to 5. The preferred dehydrating medium is a mixture of glacial acetic acid and acetic anhydride. The acetic acid and acetic anhydride can be removed by distillation, solvent extraction, solvent fractionation or neutralization with a base. Examples of several solvent fractionation methods are described in U.S. Pat. Nos. 4,362,860 and 4,471,107 which are incorporated herein by reference.

The reaction is usually conducted either under reduced pressure or in an inert atmosphere such as, for example, nitrogen, helium, neon, xenon, argon, mixtures thereof and the like.

Volatile emission during cure can be limited by subjecting the thermosettable prepolymers or resins of the present invention to sublimation, distillation or solvent extraction to remove reactants, catalyst and solvents. Suitable solvents for extraction include, for example, alcohols, acetonitrile, ethers, water, hydrocarbons, chlorinated solvents and the like. Particularly suitable solvents include acetonitrile, methanol, ethanol, water, mixtures thereof and the like.

The thermosettable prepolymers or resins of the present invention can be cured as is with the application of heat and pressure, or they can be dissolved in a suitable solvent or mixture of solvents and employed to saturate various reinforcing materials so as to prepare composites therefrom through the application of heat and pressure.

Suitable solvents which can be employed to saturate the various reinforcing materials include, for example, ketones, acetates, alcohols, ethers, hydrocarbons and the like. Particularly suitable solvents include, for example, acetone, methylethylketone, ethyl acetate, methylene chloride, trichloroethylene, tetrahydrofuran, chlorobenzene, ethanol, n-propanol, N-methyl-pyrrolidinone, dimethylformamide, dimethylacetamide, nitrobenzene, mixtures thereof and the like.

Suitable reinforcing materials include, for example, glass fibers, polyamide fiber, carbon or graphite fibers and the like in any form such as, for example, matt, woven or fibrous form. Any synthetic or natural fiber material can be employed as the reinforcing material.

The thermosettable prepolymers can be used according to various conventional techniques applicable to thermosetting resins. Powdered prepolymers are especially adapted for shaping by pressure-molding, but they can also be dissolved in a solvent or be employed in molten form. They can be used in the preparation of laminates or composites, films, coatings, encapsulants and the like.

The prepolymer is advantageously set by a thermal treatment at a temperature of from about 100° to about 300° C. When pressure molding, pressures up to about 100,000 psig (689 MPa) can be employed. Said polymer has a good thermal stability.

The alkali metal or alkaline earth metal carboxylic acid salt of the vinyl terminated prepolymers can either be homopolymerized (blended) in the presence of a N,N'-bis-imide or copolymerized with a N,N'-bis-imide of the formula:

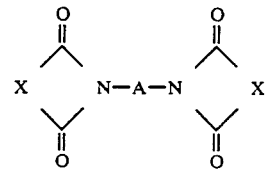

in which X represents a divalent radical containing a carbon-carbon double bond and A is a divalent radical having at least 2 carbon atoms. Preferred N,N'-bis-imides which may be employed, are 1,1'-(1,2-ethanediyl)bis-1H-pyrrole-2,5-dione; 1,1'-(1,6-hexanediyl)bis-1H-pyrrole-2,5-dione; 1,1'-(1,4-phenylene)-bis-1H-pyrrole-2,5-dione; 1,1'-(1,3-phenylene)bis-1H-pyrrole-2,5-dione; 1,1'-(methylenedi-4,1-phenylene)bis-1H-pyrrole-2,5-dione [1,1'-(methylenedi-4,1-phenylene)bismaleimide]; 1,1'-(oxydi-4,1-phenylene)bis-1H-pyrrole-2,5-dione; 1,1'-(sulfonyldi-4,1-phenylene)-bis-1H-pyrrole-2,5-dione; 1,1'-(methylenedi-4,1-cyclohexanediyl)bis-1-H-pyrrole-2,5-dione; 1,1'-[1,4-phenylenebis-(methylene)]bis-1H-pyrrole-2,5-dione; 1,1'-[(1,1-dimethyl-3-methylene-1,3-propanediyl)di-4,1-phenylene]bis-1H-pyrrole-2,5-dione; 1,1'-[(1,3,3-trimethyl-1-propene-1,3-diyl)di-4,1-phenylene]bis-1H-pyrrole-2,5-dione; and Technochemie's H-795 and M-751 resins. Technochemie's H-795 resin is represented by the formula:

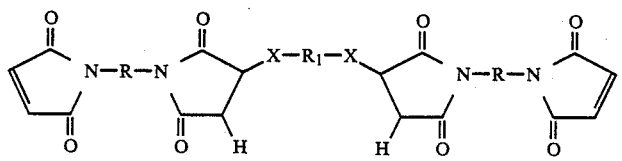

where R is an aromatic ring and X—R₁—X is a Michael addition coupling group. Technochemie's M-751 resin is a "eutectic" mixture of

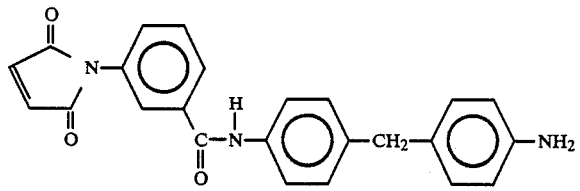

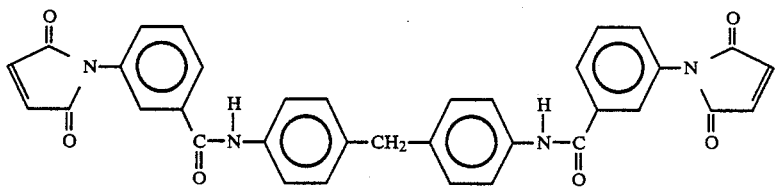

Many of these and other suitable N,N'-bis-imides which can be employed herein are disclosed in U.S. Pat. No. 3,562,223 which is incorporated herein by reference.

The following examples are illustrative of the invention, but are not to be construed as limiting the scope thereof in any manner.

EXAMPLE 1

2,3,5,6-Tetramethylpyrazine (91.6 g, 0.67 mole), pyromellitic dianhydride (218 g, 1 mole) and acetic acid (121 g, 2.01 moles) were stirred in a one liter reaction vessel equipped with a mechanical stirrer, thermometer, nitrogen gas inlet and condenser. After deoxygenation by purging with nitrogen, acetic anhydride (204 g, 2 moles) was added to the reaction vessel. The reactants were heated to a temperature between 104° C. and 133° C. for a period of 38 minutes (2280 s). The reaction mixture was cooled to 90° C. and 2-methyl-5-vinylpyridine (80 g, 0.67 mole) was added to the reaction vessel. The reactants were heated to a temperature between 118° C. and 124° C. for 11 hours and 20 minutes (40,800 s). On cooling to room temperature (22° C.), the reaction product was a black solid.

The resultant solid prepolymer was ground to a powder and neutralized with 10 wt. % sodium hydroxide solution while stirring between 60° C. and 80° C. for 6 hours (21,600 s). This solution was vacuum filtered. The black shiny filtrant (10-20 g) did not melt at 350° C.; therefore, it was discarded. A black solid product was recovered after rotary evaporation of the black colored filtrate. A sandy brown colored prepolymer was obtained after the black solid was methanol washed, dried in a vacuum oven between 80° C. and 90° C. and 30 inches (1 mm) Hg vacuum overnight and sieved with a U.S.A. Standard Testing Sieve No. 40. The sandy brown colored prepolymer melted between 240° C. and 260° C.

A proton ('H) nuclear magnetic resonance (NMR) spectrum verified that the structure of the prepolymer contained methyl, terminal unsaturated (—CH=CH₂), internal unsaturated

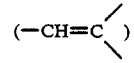

and aromatic protons which were observed by NMR absorption bands at 0.6, 5.4, between 6.0 and 6.1 and 7.6 to 8 parts per million, respectively.

The infrared spectra of the prepolymer showed a strong asymmetrical stretching band near 1580 cm$^{-1}$ and a symmetrical stretching band at 1400 cm$^{-1}$ from carboxylate ion. The spectra did not support free carboxylic acid which indicates the prepolymer was a carboxylic acid salt.

Flame emission spectroscopy showed the carboxylic acid salt of the ethenyl terminated prepolymer after treating with sulfuric acid and burning at 500° C. in air contained 15 wt. % sodium.

The sandy brown colored prepolymer was compression molded between 280° C. and 259° C. and 6800 psi (46,885 kPa) for 2 hours (7200 s) with a Carver Laboratory press, employing a silicone mold release agent. The brown cured polymer was post cured for 15 hours (54,000 s) at 255° C. Thermogravimetric analysis of the cured polymer in a nitrogen atmosphere resulted in a 5% weight loss at 383° C. and an 82% weight loss at 950° C. In air, the polymer lost 5% by weight at 370° C. and 33% by weight at 700° C.

EXAMPLE 2

The vinyl terminated prepolymer (13 g) prepared in Example 1 was mixed with oven dried and sieved 1,1'-(methylenedi-4,1-phenylene)bismaleimide (13 g, 0.036 mole) to yield a sandy brown colored powder. This mixture of prepolymers was compression molded between 260° C. and 303° C. at 6550 psi (45,161 kPa) for 2 hours (7200 s) with a Carver Laboratory press, employing a silicone mold release agent. The resulting dark brown cured polymer was post cured for 15 hours (54,000 s) at 255° C. Thermogravimetric analysis of the cured polymer in a nitrogen atmosphere resulted in a 5% weight loss at 310° C. and a 77.5% weight loss at 950° C. In air, the product lost 5% by weight at 353° C. and 47.5% at 700° C. Dynamic mechanical analysis was performed between −160° C. to 400° C. in the torsional rectangular mode with an oscillatory frequency of 1 hertz and 0.05% strain. The sodium containing polymer exhibited no glass transition temperature up to 355° C., no apparent gamma transition ($T_y$) and storage modulus (G′) of $9.198 \times 10^9$ dynes/cm at 25° C.

COMPARATIVE EXPERIMENT A

Oven dried and sieved 1,1′-(methylenedi-4,1-phenylene)bismaleimide (20 g, 0.056 mole) was compression molded between 255° C. and 300° C. at 7200 psi (49,643 kPa) for 2 hours (7200 s) with a Carver Laboratory press, employing a silicone mold release agent. The yellowish brown translucent polymer was post cured for 15 hours (54,000 s) at 255° C. Thermogravimetric analysis of the cured polymer in a nitrogen atmosphere showed a 5% weight loss at 490° C. and a 51.5% weight loss at 950° C. In air, the polymer lost 5% by weight at 428° C. and 100% by weight at 700° C. The cured sodium carboxylic acid salt of the ethenyl terminated prepolymer either homopolymerized in the presence of 1,1′-(methylenedi-4,1-phenylene)bismaleimide or copolymerized with 1,1′-(methylenedi-4,1-phenylene)bismaleimide described in Example 2 is much more thermally stable in air at 700° C. than 1,1′-(methylenedi-4,1-phenylene)bismaleimide cured by itself.

I claim:

1. A cured product resulting from subjecting to conditions suitable for curing a thermosettable prepolymer prepared by reacting
   (A) the reaction product of
      (1) a heterocyclic material having one or more rings therein, at least one nitrogen atom in a ring and at least two substituent groups which have at least one reactive hydrogen atom attached to a carbon atom which is attached to a heterocyclic ring;
      (2) a cycloaliphatic or aromatic carboxylic acid mono- or dianhydride; and
      (3) a compound containing both a polymerizable ethylenically unsaturated group and at least one group selected from
         (a) a heterocyclic material having one or more rings, at least one nitrogen atom in a ring and at least one substituent group which has at least one reactive hydrogen atom attached to a carbon atom which is attached to a heterocyclic ring or
         (b) a cycloaliphatic or aromatic carboxylic acid mono- or dianhydride group; with
   (B) an aqueous or alcoholic solution of a hydroxide, carbonate or bicarbonate of a metal of groups I-A or II-A; and wherein the components of (A) are employed in a molar ratio of (1):(2):(3) of from about 1:0.25:0.25 to about 1:4:4, respectively and components A and B are present in quantities which are sufficient to react at least a portion of either the anhydride, lactone, or combination of both anhydride and lactone groups present in component (A) with component (B).

2. A cured product of claim 1 wherein
   (a) component (A-1) is a pyrazine or pyridine;
   (b) component (A-2) is represented by the formula

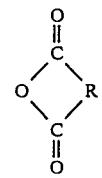

or

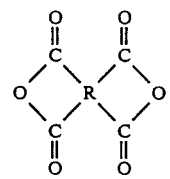

wherein R is a cycloaliphatic or aromatic group;
   (c) component (A-3) is a (1) pyridine or (2) cyclic carboxylic acid monoanhydride represented by the formula

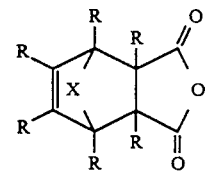

in which R is a hydrogen, halogen or a 1 to 4 carbon alkyl group and X is either —CH₂—, —CH₂CH₂—, —O—, —NH—, —CCl₂— or —S—; and
   (d) component (B) is an alkali metal hydroxide;
   (e) the components of (A) are employed in a molar ratio of (1):(2):(3) of from about 1:0.5:0.5 to about 1:1.5:1.5, respectively; and
   (f) components A and B are present in quantities which are sufficient to react from about 10 to about 100 percent of the anhydride and lactone groups remaining in component (A) with component (B).

3. A cured product of claim 2 wherein components (A) and (B) are present in quantities which are sufficient to react from about 50 to about 100 percent of the anhydride and lactone groups present in component (A) with component (B).

4. A cured product of claim 3 wherein
   (a) component (A-1) is 2,3,5,6-tetramethylpyrazine, 2,4,6-trimethylpyridine, or combination thereof;
   (b) component (A-2) is pyromellitic dianhydride, phthalic anhydride, or combination thereof; and
   (c) component (A-3) is 2-methyl-5-vinylpyridine, cis-5-norbornene-endo-2,3-dicarboxylic anhydride, or combination thereof.

5. A cured product of claims 1,2,3 or 4 wherein said curing is accomplished by heat and pressure.

6. A cured product of claim 5 wherein said curing is effected by compression molding at a temperature of from about 100° C. to about 350° C. and a pressure of up to about 10,000 psig.

7. A cured product of claims 1,2,3 or 4 which contains a reinforcing material.

8. A cured product of claim 5 which contains a reinforcing material.

9. A cured product of claim 6 which contains a reinforcing material.

* * * * *